United States Patent Office 3,121,609
Patented Feb. 18, 1964

3,121,609
PROCESS FOR PREPARING CUPROUS CHLORIDE AND CATALYST CONTAINING SAME
Alwyn Charles Buckland and Calvin Charles Rolland, New Orleans, La., assignors to American Cyanamid Company, New York, N.Y., a corporation of Maine
No Drawing. Filed Apr. 26, 1961, Ser. No. 105,547
4 Claims. (Cl. 23—97)

This invention relates to a process for the preparation of cuprous chloride. In another aspect, this invention relates to a process for preparing a Nieuwland type catalyst containing cuprous chloride.

Numerous methods have been proposed for the preparation of cuprous chloride. The foremost of these methods is that which involves heating an excess of elemental or metallic copper with chlorine at a temperature above the melting point of the resulting cuprous chloride. While this particular method has met with wide commercial acceptability, nevertheless, primary hazards are presented in the operation because of the toxicity and odor of chlorine. The present invention overcomes the numerous disadvantages inherent in the preparation of cuprous chloride from copper and chlorine.

It is also well-known that acrylonitrile is obtained from acetylene and hydrogen cyanide by the use of what is commonly referred to as a Nieuwland type catalyst. This catalyst is characterized by having present therein approximately equimolecular quantities of cuprous chloride and a solubilizing chloride. The solubilizing chloride is usually ammonium chloride. However, alkali metal chlorides such as sodium chloride, potassium chloride and the like have also been employed both in place of and in addition to the ammonium chloride component. It is a feature of the present invention that a Nieuwland type catalyst for use in the synthesis of acrylonitrile may be prepared in a simple and direct manner whereby the attendant hazard of the use of chlorine in the preparation of the cuprous chloride component of the catalyst is avoided.

The present invention involves contacting metallic copper with an acidified aqueous solution of ammonium chloride, passing an oxygen containing gas through the solution to dissolve copper, subsequently treating the resultant solution with copper in the absence of substantial amounts of oxygen to reduce the thus formed cupric chloride to cuprous chloride, and diluting the thus obtained solution with water to recover pure cuprous chloride. In another aspect of the present invention, the last mentioned water dilution step may be omitted and the cuprous chloride-ammonium chloride solution may be employed directly in an acrylonitrile synthesis reactor as the desired Nieuwland type catalyst.

The process of the present invention will be better understood from a consideration of the reactions involved. As illustrated below, the reactions are believed to proceed as:

(A)  $Cu^0 + \frac{1}{2}O_2 + 2HCl \rightarrow CuCl_2 + H_2O$
     $Cu^0 + 4NH_4Cl + \frac{1}{2}O_2 \rightarrow$
              $Cu(NH_3)_4Cl_2 + H_2C + 2HCl$
(B)  $CuCl_2 + Cu^0 \rightarrow 2CuCl$
     $Cu(NH_3)_4Cl_2 + Cu^0 \rightarrow 2CuCl + 4NH_3$ As will be seen from the above equations, the overall reaction proceeds in two steps. During step A, the oxidation step, elemental copper combines with the hydrochloric acid present to yield cupric chloride and also forms a complex with the solubilizing ammonium chloride. During step B, the reaction step, elemental copper reacts with the cupric chloride and complex formed in step A to produce cuprous chloride.

In the process of this invention, it is essential that hydrogen chloride or a solution thereof be added to the ammonium chloride solution containing therein metallic or elemental copper while an oxygen containing gas is being passed through the mixture. Generally, an amount of hydrogen chloride is added so as to provide two moles of chloride ion for each gram atomic weight of copper.

Steps A and B of the process for the preparation of cuprous chloride and also that of Nieuwland type catalyst may be carried out consecutively or simultaneously.

When the steps of the process are carried out consecutively, a solution of ammonium chloride and elemental copper are contacted while an oxygen containing gas is passed through the solution. Hydrogen chloride or a solution thereof is added to the copper-ammonium chloride solution. Subsequently, an additional amount of ammonium chloride is added as the copper dissolves and reaches the cupric state. Following the complete oxidation of the metallic copper, the flow of the oxygen containing gas is stopped and an inert or nonreactive gas such as nitrogen, methane and the like is then admitted into the system. The gas thus must be one which does not form undesirable by-products with the reactants or the products. During the flow of the inert or nonreactive gas, an additional quantity of elemental copper at least sufficient to combine with the cupric chloride which has been formed and preferably an excess is added to the system. Following the completion of reaction, i.e. the reduction of the cupric ion, the concentration of the solution is then adjusted by the addition of ammonium chloride or an alkali metal chloride such as sodium chloride or potassium chloride and hydrogen chloride so as to provide a Nieuwland type catalyst for use directly in the acrylonitrile synthesis reactor. Alternatively, pure cuprous chloride may be precipitated prior to the concentration adjustment step by dilution of the solution with water usually in an amount of one to fifteen, preferably five to ten, volumes of water for each volume of solution containing cuprous ion. The thus precipitated cuprous chloride is recovered from the solution by filtration or other conventional separative technique, washed and dried.

When the steps of the process are carried out simultaneously, which also forms a part of the present invention, an aqueous solution of ammonium chloride is placed in an oxidation chamber. An oxygen containing gas together with hydrogen chloride is then admitted into the chamber. The acidified ammonium chloride solution is then circulated through a reduction chamber having present therein metallic or elemental copper. The solution is continuously circulated through both the oxidation and reduction chambers and as the copper is dissolved, an additional quantity of ammonium chloride or alkali metal chloride such as sodium chloride, potassium chloride and the like is added to the oxidation chamber in order to prevent the formation of solids and to solubilize the cuprous chloride formed. A blanket of an inert or non-reactive gas such as nitrogen is maintained within the reduction chamber. Following the completion of reaction, the cuprous chloride-ammonium chloride or alkali metal chloride solution is withdrawn and diluted with cold water in an amount from about one to fifteen, preferably five to ten, volumes of water for each volume of withdrawn cuprous chloride-ammonium chloride or alkali metal chloride solution and is then isolated as a white precipitate from the mother liquor. Alternatively, the cuprous chloride-ammonium chloride or alkali metal chloride solution may be employed in the acrylonitrile synthesis reactor following adjustment of the concentration by the addition to the solution of an additional quantity of ammonium chloride, hydrogen chloride and/or water. Frequently, the addition of a small amount of cupric chloride, e.g. 1%, to the oxidation chamber prior to the start of the process serves to promote the initial reaction.

The temperature at which the preparation of cuprous chloride or Nieuwland type catalyst is effected is usually in the range of from about 80° C. to 100° C. Temperatures lower than 80° C. may be used but no particular advantage is seen in carrying out the process at such temperatures because the rate of reaction is usually diminished and frequent plugging of equipment is encountered. Preferably a temperature of from about 95° C. to about 100° C. is employed.

While any oxygen containing gas may be employed, it will be evident that such oxygen containing gas must also be free from any measurable quantities of a reducing gas. Although pure oxygen may be employed in the process of this invention, the use of air as the oxygen containing gas is particularly desirable because of lower cost. Usually, the amount of oxygen containing gas admitted into the oxidation vessel is in excess of that required to convert the metallic copper to the cupric state. It is preferred that the oxygen containing gas be added at the greatest possible rate while obtaining complete absorption. Elemental or metallic copper may be employed in any of various forms which provide large surface areas. Thus, copper powder, copper scrap wire, thin electrolytic sheet copper and cement copper have all been employed with good success. The concentration of ammonium chloride or alkali metal chloride may be varied greatly in accordance with the amount of cuprous chloride to be prepared. Usually, at least 10% by weight of such solubilizing chloride is necessary. However, amounts of from about 15% to about 35% by weight are preferred.

In order to further illustrate the mode of operation of the present invention, the following examples, in which all parts are by weight unless otherwise indicated, are given.

*Example 1*

Into a suitable reaction vessel are charged 204 parts of ammonium chloride, 286.8 parts of elemental copper and 461 parts of water. The temperature of the mixture is raised to 95–100° C. while bubbling air containing hydrogen chloride through the solution. The amount of hydrogen chloride which is added is 450 parts. During the course of reaction, the solution develops a brown and then greenish blue color indicating that the copper is dissolving and is reaching the cupric state. After two to three hours, an additional 204 parts of ammonium chloride is added. Following the complete dissolution of the copper, the flow of air is stopped and nitrogen is then admitted into the vessel. 286.8 parts of elemental copper are then added gradually with stirring. Following the completion of the reaction, the resulting solution is diluted with seven volumes of cold water. The white cuprous chloride which precipitates is then separated by filtration and dried.

*Example 2*

The procedure of Example 1 is repeated except that the cuprous chloride precipitation step is omitted and in place thereof 65.4 parts of water are added so as to obtain a Nieuwland catalyst solution containing approximately 20.86% ammonium chloride, 33.44% water, and 45.70% cuprous chloride.

*Example 3*

Into a suitable reaction vessel is charged 204 parts of ammonium chloride and 461 parts of water. The temperature of the solution is increased to 95–100° C. and oxygen admixed with 450 parts of hydrogen chloride is bubbled into the vessel below the level of the solution. A portion of the solution is continuously withdrawn and led into a second reaction vessel containing therein 573.6 parts of elemental copper. The solution is continuously circulated through the oxidation vessel and the reduction vessel. During the dissolution of the copper from the reduction vessel, 204 parts of ammonium chloride are added gradually with stirring to the oxidation vessel at a rate so as to prevent formation of solids. The circulation through both vessels is continued for five hours until all of the copper has dissolved. The solution is then diluted with seven volumes of cold water and white cuprous chloride is precipitated therefrom. The precipitate is filtered and dried.

*Example 4*

The procedure of Example 3 is repeated except that the water dilution step is omitted and in place thereof the concentration of the final solution is adjusted by the addition of 65.4 parts of water to give a composition approximately 20.86% ammonium chloride, 33.44% water, and 45.70% cuprous chloride. This solution is then employed directly in an acrylonitrile synthesis reactor.

While the present invention has been described in connection with several preferred embodiments it is to be understood that the invention is not restricted to the modifications herein described, but it is intended to include such modifications and variations of the methods which are apparent to those skilled in the art, and the invention is not to be limited except as appears in the claims hereinafter.

We claim:
1. A process for the manufacture of cuprous chloride which comprises contacting copper with an aqueous solution containing hydrogen chloride and ammonium chloride, passing an oxygen containing gas through the solution to dissolve copper, treating the resultant solution with copper in the absence of substantial amounts of oxygen and diluting the thus obtained solution with water to obtain cuprous chloride.

2. A process as in claim 1, in which the oxygen containing gas is air.

3. A process for the manufacture of Nieuwland type catalyst which comprises contacting copper with an aqueous solution containing hydrogen chloride and ammonium chloride, passing an oxygen containing gas through the solution to dissolve copper, and treating the resultant solution with copper in the absence of substantial amounts of oxygen.

4. A process as in claim 3, in which the oxygen containing gas is air.

References Cited in the file of this patent
UNITED STATES PATENTS

| | | |
|---|---|---|
| 1,763,781 | Heath et al. | June 17, 1930 |
| 3,030,178 | Niemann et al. | Apr. 17, 1962 |

UNITED STATES PATENT OFFICE
CERTIFICATE OF CORRECTION

Patent No. 3,121,609            February 18, 1964

Alwyn Charles Buckland et al.

It is hereby certified that error appears in the above numbered patent requiring correction and that the said Letters Patent should read as corrected below.

Column 1, lines 60 and 61, the reaction should appear as shown below instead of as in the patent:

$$Cu^0 + 4NH_4Cl + \tfrac{1}{2}O_2 \longrightarrow Cu(NH_3)_4Cl_2 + H_2O + 2HCl$$

Signed and sealed this 7th day of July 1964.

(SEAL)
Attest:

ERNEST W. SWIDER
Attesting Officer

EDWARD J. BRENNER
Commissioner of Patents